US012495244B2

(12) United States Patent
Hoffmann

(10) Patent No.: US 12,495,244 B2
(45) Date of Patent: Dec. 9, 2025

(54) ACOUSTIC METAMATERIAL DEVICE, METHOD AND COMPUTER PROGRAM

(71) Applicant: Sony Group Corporation, Tokyo (JP)

(72) Inventor: Falk-Martin Hoffmann, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 201 days.

(21) Appl. No.: 18/271,481

(22) PCT Filed: Jan. 21, 2022

(86) PCT No.: PCT/EP2022/051383

§ 371 (c)(1),
(2) Date: Jul. 10, 2023

(87) PCT Pub. No.: WO2022/157329

PCT Pub. Date: Jul. 28, 2022

(65) Prior Publication Data

US 2024/0107224 A1 Mar. 28, 2024

(30) Foreign Application Priority Data

Jan. 25, 2021 (EP) .................................... 21153305

(51) Int. Cl.

| | |
|---|---|
| ***H04R 1/28*** | (2006.01) |
| ***H04R 1/40*** | (2006.01) |
| ***H04R 3/00*** | (2006.01) |
| ***H04R 29/00*** | (2006.01) |

(52) U.S. Cl.

CPC ........... *H04R 1/2876* (2013.01); *H04R 1/406* (2013.01); *H04R 3/005* (2013.01); *H04R 29/005* (2013.01)

(58) Field of Classification Search

CPC ...... H04R 1/2876; H04R 1/406; H04R 3/005; H04R 29/005

USPC ........................................................... 381/92

See application file for complete search history.

(56) References Cited

U.S. PATENT DOCUMENTS

| | | | | |
|---|---|---|---|---|
| 10,631,086 | B1 | 4/2020 | Bagg | |
| 2010/0329475 | A1 | 12/2010 | Killion et al. | |
| 2010/0329478 | A1 | 12/2010 | Kubin et al. | |
| 2014/0270245 | A1 | 9/2014 | Elko et al. | |
| 2019/0086536 | A1 * | 3/2019 | Rogers | H01Q 1/04 |
| 2019/0306649 | A1 * | 10/2019 | Giron | H04S 7/301 |

OTHER PUBLICATIONS

Zhen, A tunable acoustic metamaterial with double-negative driven by electromagnets (Year: 2016).*

International Search Report and Written Opinion mailed on Apr. 12, 2022, received for PCT Application PCT/EP2022/051383, filed on Jan. 21, 2022, 11 pages.

(Continued)

*Primary Examiner* — William A Jerez Lora

(74) *Attorney, Agent, or Firm* — XSENSUS LLP

(57) ABSTRACT

A device comprising: an acoustic metamaterial (AMM), wherein the phase velocity of an acoustic wave is reduced at low frequencies as compared to the phase velocity at higher frequencies; a microphone array (MIC) of at least two microphones (mic1, mic2) embedded in the acoustic metamaterial (AMM) and configured to detect acoustic waves.

16 Claims, 12 Drawing Sheets

(56) References Cited

OTHER PUBLICATIONS

Alon et al., "Beamforming with Optimal Aliasing Cancellation in Spherical Microphone Arrays", IEEE/ACM Transactions on Audio, Speech, and Language Processing, vol. 24, No. 1, Jan. 2016, pp. 196-210.
Bai et al., "Acoustic Array Systems Theory, Implementation, and Application", Wiley-IEEE Press, 2013, pp. 73.
Buck et al., "Acoustic Array Processing for Speech Enhancement", Handbook on Array Processing and Sensor Networks, Chapter-8, Jan. 22, 2010, pp. 231-246.
Groby et al., "The use of slow waves to design simple sound absorbing materials", Journal of Applied Physics, vol. 117, No. 124903, Mar. 25, 2015, pp. 124903-1-124903-9.
Robert C. Hansen, "Phased Array Antennas", Second Edition, Nov. 2009, pp. 37-38.
Kim et al.,"Virtual Herschel-Quincke tube using the multiple small resonators and acoustic metamaterials", Journal of Sound and Vibration, vol. 466, Feb. 3, 2020, 16 pages.
Hoffmann et al., "Theoretical Study of Acoustic Circular Arrays With Tangential Pressure Gradient Sensors", Jul. 31, 2015, pp. 1-32.
M. A. Poletti, "Effect of Noise and Transducer Variability on the Performance of Circular Microphone Arrays", Journal of the Audio Engineering Society, vol. 53, No. 5, May 2005, pp. 371-384.
Meyer et al., "Spherical Harmonic Modal Beamforming for an Augmented Circular Microphone Array", IEEE International Conference on Acoustics, Speech and Signal Processing, 2008, pp. 5280-5283.
Boaz Rafaely, "Fundamentals of Spherical Array Processing", Springer Topics in Signal Processing, 2019, pp. 81.
Theocharis et al., "Limits of slow sound propagation and transparency in lossy, locally resonant periodic structures", New Journal of Physics, vol. 16, 2014, pp. 1-17.
Harry L. Vans Trees, "Optimum Array Processing", John Wiley & Sons, Inc., Mar. 22, 2002, pp. 50-51.
Xie et al., "Single-sensor multispeaker listening with acoustic metamaterials", Proceedings of the National Academy of Sciences, vol. 112, No. 34, Aug. 25, 2015, pp. 10595-10598.
Xinjing et al., "An Acoustic Metamaterial-Based Sensor Capable of Multiband Filtering and Amplification", IEEE Sensors Journal, vol. 20, No. 8, Apr. 15, 2020, pp. 4413-4419.

* cited by examiner

ACOUSTIC METAMATERIAL DEVICE, METHOD AND COMPUTER PROGRAM

CROSS-REFERENCE TO RELATED APPLICATIONS

The present application is based on PCT filing PCT/EP2022/051383, filed Jan. 21, 2022, which claims priority from European Patent Application Number EP21153305.4, filed Jan. 25, 2021, the contents of each are hereby incorporated by reference.

TECHNICAL FIELD

The present disclosure relates to the field of acoustics, in particular to microphone arrays and acoustic beamforming, a corresponding method for acoustic beamforming, and a computer program for acoustic beamforming.

TECHNICAL BACKGROUND

Microphone arrays typically consist of a set of microphones distributed about the perimeter of a space linked to an evaluation device that records and processes the electric signals into a coherent. Typically, an array is made up of multiple microphones (omnidirectional, but also directional microphones).

State-of-the-art microphone array technology suffers from limited and corrupted directivity outside an array-specific optimum frequency band. The maximum directivity of a microphone array is determined by the size of the array aperture, the number of sensors therein and their arrangement.

SUMMARY

According to a first aspect, the disclosure provides a device comprising: an acoustic metamaterial, wherein the phase velocity of an acoustic wave is reduced at low frequencies as compared to the phase velocity at higher frequencies; a microphone array of at least two microphones embedded in the acoustic metamaterial and configured to detect acoustic waves.

According to a further aspect, the disclosure provides a system comprising a device comprising: an acoustic metamaterial, wherein the phase velocity of an acoustic wave is reduced at low frequencies as compared to the phase velocity at higher frequencies; a microphone array of at least two microphones embedded in the acoustic metamaterial and configured to detect acoustic waves. The system further comprises a processor configured to evaluate the signals received by the microphone array to create a directivity pattern of the microphone array.

According to a further aspect, the disclosure provides a computer-implemented method of receiving signals from a device comprising an acoustic metamaterial, wherein the phase velocity of an acoustic wave is reduced at low frequencies as compared to the phase velocity at higher frequencies; a microphone array of at least two microphones embedded in the acoustic metamaterial and configured to detect acoustic waves. The method further comprises evaluating the signals received by a microphone array of the device to create a directivity pattern of the microphone array.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
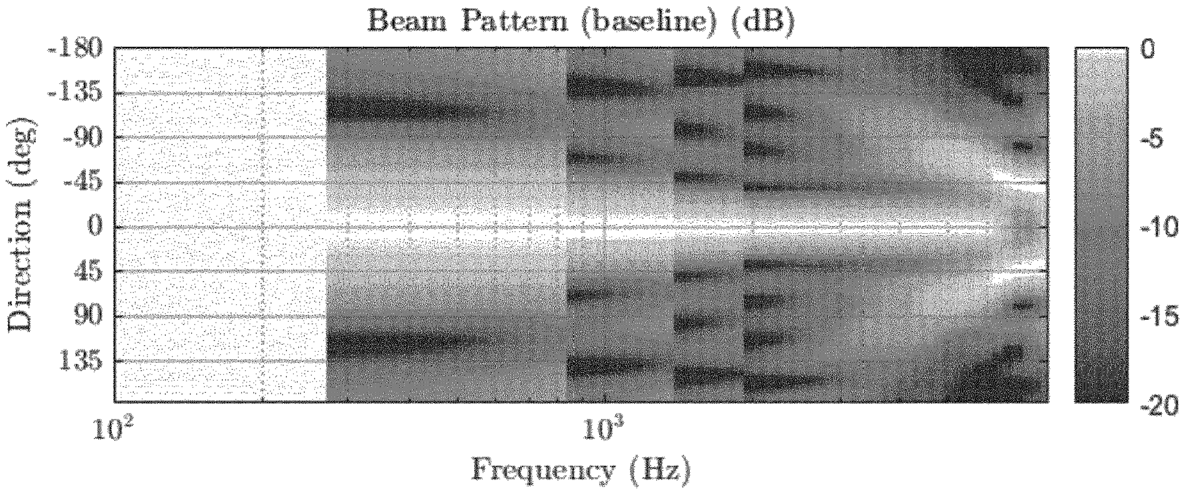
FIG. 1 is a diagram illustrating a beam pattern of a circular microphone array.

The embodiments disclose a device comprising an acoustic metamaterial, wherein the phase velocity of an acoustic wave is reduced at low frequencies as compared to the phase velocity at higher frequencies; and a microphone array of at least two microphones embedded in the acoustic metamaterial and configured to detect acoustic waves.

The microphone array may comprise two or more microphones which may be embedded into the metamaterial in which an acoustic wave exhibits a low phase velocity at low frequencies. The microphones may for example comprise pressure sensors as microphones.

An acoustic metamaterial may be a material designed to control sound waves in gases, liquids, and solids (crystal lattices). A metamaterial may for example be used to direct and/or manipulate sound waves in gases, liquids, and solids. An acoustic metamaterial may for example be composed of a plurality of sub-units that are arranged periodically so that they influence the propagation of acoustic waves through the metamaterial in a defined manner. The size of the sub-units, also known as meta-atoms, is typically much smaller than the wavelength of acoustic waves within the frequency region of interest. The acoustic metamaterial may for example be arranged in a structure with desired acoustic properties.

The acoustic metamaterial can for example be produced from acrylonitrile butadiene styrene plastics using fused filament fabrication 3D printing technology. It should be mentioned that there are many possibilities for metamaterial fabrication. Every kind of material with known transfer function, or any material forming a Helmholtz resonator, can be used for the acoustic metamaterial. Other resonant acoustic elements such as quarter wavelength resonators or membranes can be used instead of the Helmholtz resonator.

By embedding a microphone array into a metamaterial that exhibits a property of significantly lowering phase velocity of waves at low frequencies, the device may provide the same or similarly high directivity at low frequencies as in its optimal frequency band. The significantly reduced phase velocity at low frequencies may reduce the wavelength and permit the spatial sampling of a low-frequency wave with large phase difference with an array whose sensors are placed comparably close together. This enables super-directional beamforming at low frequencies which would otherwise not be possible. At high frequencies, an acoustic wave in the metamaterial may exhibit a phase velocity similar to that in air. It is beneficial to choose the array geometry such that the frequency above which aliasing occurs is sufficiently high, and then design the metamaterial such that it ensures high directivity at low frequencies with the chosen array geometry. The combination of both yields an improved directivity across a wide frequency range. The invention is independent of the array geometry.

In the acoustic metamaterial, at low frequencies, the phase velocity of an acoustic wave may be reduced as compared to a surrounding medium. The surrounding medium may for example be air. Still further, in the acoustic metamaterial, at low frequencies, the phase velocity of an acoustic wave may be significantly lower as compared to the phase velocity in a surrounding medium. At high frequencies, an acoustic wave in the acoustic metamaterial may exhibit a phase velocity similar to that in a surrounding medium. Still further, the acoustic metamaterial may exhibit a property of providing a low phase velocity of waves at low frequencies. These low frequencies may be those frequencies where the directivity of the microphone array generally decreases when there is no metamaterial present. 'Low frequencies' may thus refer to frequencies below the optimum frequency band (within which the directivity in a non-dispersive medium is the best the array can achieve), where the directivity suffers due to poor conditioning of the inverse problem. In order to improve the performance of a given array geometry below its optimum frequency band in a surrounding non-dispersive medium, the embodiments described below in more detail embed it into a metamaterial that yields a lower phase velocity than that of the non-dispersive medium below the optimum frequency band. In the optimum frequency band, it may have at the same time roughly the same phase velocity of the non-dispersive medium.

The metamaterial becomes a building block that introduces dispersive behaviour to the surrounding medium, but preferably only inside the volume where the metamaterial is located. The effect of the metamaterial on the phase velocity may gradually increase with lower frequencies. For high frequencies above the optimal band, spatial aliasing occurs and adversely affects the directivity through spatial ambiguity. Ideally, the effect of the metamaterial compensates the decrease of the directivity of the microphone array at lower frequencies. To achieve an improvement, it is however sufficient to decrease to some extent the phase velocity at frequencies where the directivity of a microphone array without metamaterial is not optimal. According to a simulation result of an exemplifying device, the directivity may for example be significantly improved between 100 to 1300 Hz. These numbers are, however, only for illustrative purpose, as they depend on the design of the microphone array.

With the device of the embodiments, the directivity of the microphone array may be improved at low frequencies, while the performance at high frequencies is preserved as compared to the microphone array not being embedded in the acoustic metamaterial.

For example, in the acoustic metamaterial the phase velocity of an acoustic wave with a low frequency may be different to the phase velocity in a surrounding medium, while the phase velocity of acoustic waves with a middle or high frequency may not be different to the phase velocity in a surrounding medium.

According to the embodiments, the acoustic metamaterial may comprise an acoustically rigid housing material and a plurality of resonators. The resonators may be identical resonators. In particular, the resonators may be Helmholtz resonators. The Helmholtz resonator may comprise a compliance cavity of a known volume $V_0$ with a small acoustic mass channel open with a cross-sectional area and a larger cavity on the other end to emit the sound.

The metamaterial may for example contain a multitude of identical Helmholtz resonators embedded into a cylindrical slab of acoustically rigid material used as a housing. Each Helmholtz resonator may comprise a larger compliance cavity and a small acoustic mass channel.

The acoustic metamaterial may comprise a plurality of sub-units (segments) of acoustic metamaterial. Still further, the metamaterial may be arranged around a microphone in segments. The segments may for example have the shape of slabs, cubic, spherical or cuboid or any other geometrical shape. A cylindrical slab of a metamaterial may serve to create slow sound at low frequencies. A segment such as a slab may be a building stone of the metamaterial suitable to house the microphone array.

The segments of acoustic metamaterial may be slabs which are arranged in a tower. For example, a plurality of segments (e.g. slabs) may be grouped together to a larger structure, for example piled into a tower. Gaps may be left between each segment which may yield an acoustic environment that creates slow sound at low frequencies within the gaps. A microphone array may be placed for example in the centre of a gap between segments. In other embodiments, the microphones may be embedded into a metamaterial whose outline can be of any shape and permit sound travelling freely along all three dimensions.

The embodiments also describe a system comprising the device as described here, and a processor configured to evaluate the signals received by the microphone array to create a directivity pattern of the microphone array. The processor may be a CPU, a microcomputer, a computer, or any other circuit configured to perform calculation operations. The processor may be configured to yield a specific directivity pattern of the microphone array. The processor may be configured to decompose the sound signal based on analytical sound field modelling and/or state-of-the-art signal processing strategies, e.g. compressive sensing (CS). Any compressive sensing techniques like L1-norm minimization, Edge-preserving total variation, iterative model using a directional orientation field and directional total variation or the like may be used for decomposing the sound signal. The processor may be configured to decompose the sound signal based on the minimization of the L1 norm of the sound signal, e.g. of coefficients of a decomposition of the sound signal.

The embodiments also describe a computer-implemented method of receiving signals from a device and evaluating the signals received by a microphone array of the device to yield a directivity pattern of the microphone array as described here.

When spatially sampling the field of a single source/plane wave (simplest case), the phase difference between the microphones in any microphone array depends largely on the distance between the individual microphones and the acoustic wavelength. A high frequency wave has a short wavelength, and therefore microphones can be put relatively close together and still yield a large phase difference, thus showing a good beamforming performance. Low frequencies, on the other hand, have very large wavelengths. Hence, in order to obtain a high directivity beamformer at low frequencies, the microphones would need to be far apart (typically more than 5 m) [1,2,3]. The required dimensions would quickly render such a microphone array impracticable.

The lower bound of the frequency band that is accessible to beamforming is related to the corresponding wavelength exceeding the finite array aperture. The upper bound marks the point where the array performance starts suffering from spatial aliasing because the inter-sensor distance becomes large compared to the spatial variance of the wave field. The problem at low frequencies is explained by means of acoustical considerations. However, it is equally inherent to other wave phenomena (EM, structural, etc.). The poor conditioning at low frequencies arises from the small phase difference between the comparably closely spaced microphones. At low frequencies, the beam pattern of a microphone array will suffer from low directivity, irrespective of the geometrical arrangement.

FIG. 1 visualizes a simulated directivity pattern of a circular microphone array at different frequencies. The simulated directivity pattern has been obtained with a circular microphone array comprising L=9 microphones with radius r=0.1 m. The frequency of the acoustic wave received by the microphone array is displayed on the x-axis with a range of 100 Hz to 8 kHz. The directivity pattern is represented as a density plot. The y-axis of the density plot represents the direction from −180 to 180 degrees from which the wave impinges on the microphone array that is set to aim in the 0-degree direction. The grey-scale of the density plot represents, for each frequency and direction the normalised array response in decibels in the range from 0 to −20 decibels. The microphone array is configured to aim in the direction of 0°. In the diagram, the bright areas illustrate high array response and dark areas illustrate the directions with no or low response to an incoming plane wave. It can be clearly seen that the beam width increases towards low frequencies, due to poor conditioning of the inverse system [4,5]. According to the density plot, the directivity at frequencies from 100 Hz to about 250 Hz is omnidirectional. This arises from the small phase difference between the comparably closely spaced microphones at low frequencies. Between 250 Hz to 3 kHz the microphone array exhibits a certain directivity. Towards the high frequencies the directivity of the microphone array increases. That is, the listening "beam" width increases towards lower frequencies because of poor conditioning of the inverse system. At higher frequencies more microphones in the circular array receive a signal with a significant phase difference so that a better directivity result is achieved.

At high frequencies above 3 kHz a spatial aliasing effect is visible which impedes the directivity result.

State-of-the-art microphone arrays perform acoustic beamforming by delaying and summing the signals from the individual microphones to maximize the array output for a certain direction of acoustic wave incidence. This largely relies on the phase difference between the individual microphone signals. They may also perform further signal processing to account for special geometries, scattering, frequency response or noise filtering, etc.

If the problem of poor conditioning at low frequencies is solved by increasing the distance between microphones and thereby making the spatial sampling coarser a different problem arises. Taking this step would aggravate the problem of spatial aliasing, which would cause artefacts in the beampattern at high frequencies [1,2]. The state-of-the art in dealing with spatial aliasing is to either design the array so that no aliasing can occur within the frequency band of interest, signal processing [6] or by placing means of rejection of the corrupting higher orders by using sensors that function as a spatial low-pass filter [7].

Figure 2:
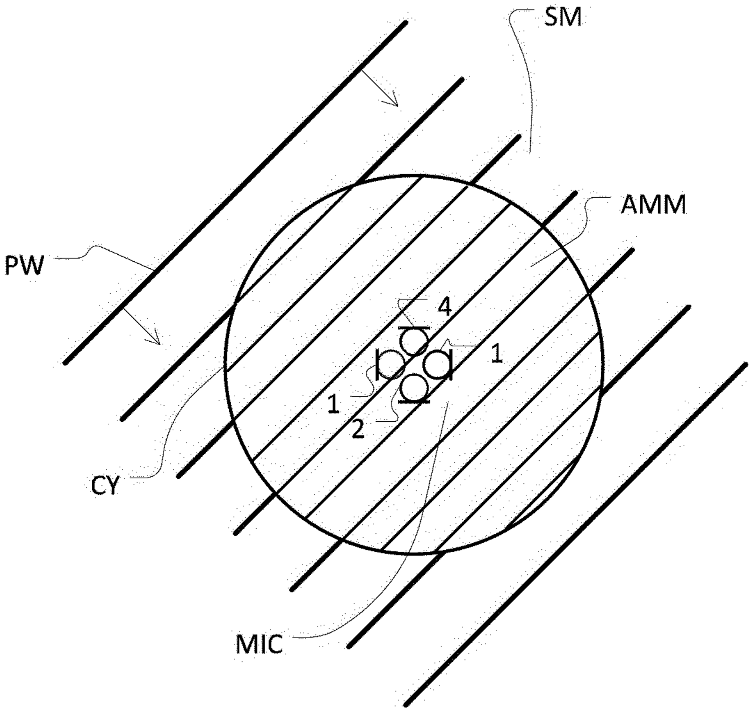
FIG. 2 is a diagram schematically illustrating the change of phase velocity of a plane wave impinging on a microphone array embedded into an acoustic metamaterial in a cylinder that is assumed infinite in height.

FIG. 2 schematically visualizes the change of phase velocity of an acoustic plane wave entering a region comprising an acoustic metamaterial. A microphone array MIC comprising four microphones 1, 2, 3 and 4 is embedded into an acoustic metamaterial AMM in an infinite cylinder CY which is visualized in profile. Further there is a plane wave PW visualized by parallel bars impinging on the microphone array MIC. Outside the cylinder CY the plane wave PW has a certain phase velocity and frequency. Inside the cylinder the plane wave PW has a smaller phase velocity because of the acoustic metamaterial AMM. The smaller phase velocity in the acoustic metamaterial AMM compared to the surrounding medium SM is visualized by the greater distance between the wave fronts outside the cylinder CY and the smaller distance between the wave fronts inside the cylinder CY.

Figure 3:
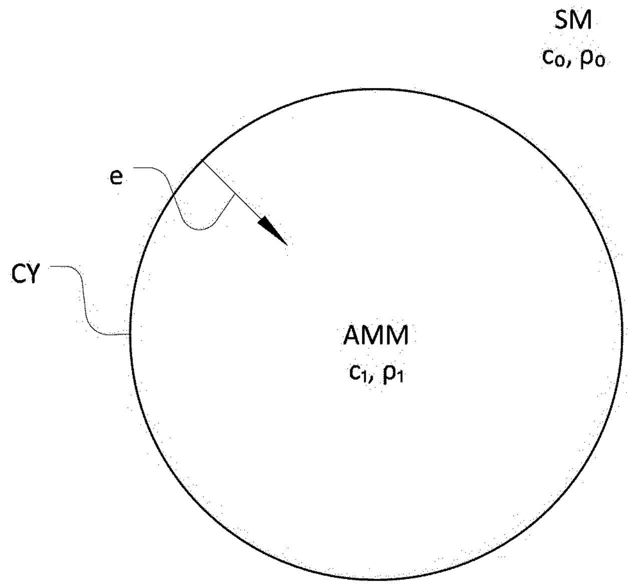
FIG. 3 is a diagram schematically illustrating a plane wave travelling in direction e through an infinite cylinder (CY) comprising an acoustic metamaterial (AMM) which is located in a surrounding medium (SM)

FIG. 3 schematically illustrates the cross section of the infinite cylinder of FIG. 2 comprising an acoustic metamaterial which is located in a surrounding medium. An infinite cylinder CY spreading along the z-axis in a surrounding medium SM is visualized in cross-sectional view. The infinite cylinder CY is comprised of an acoustic metamaterial AMM with a certain density $\varrho_0$ at a given frequency. The surrounding medium SM outside the cylinder has a density $\varrho_0$, where $|\varrho_0|<|\varrho_1|$ (see reference [9]). A plane wave travels in the direction of a vector e. This vector e is the direction of propagation which is in this case limited to the xy-plane. Outside the cylinder CY the phase velocity of the plane wave is $c_0$, while inside the phase velocity is $c_1$, where $c_0>c_1$.

Figure 4:
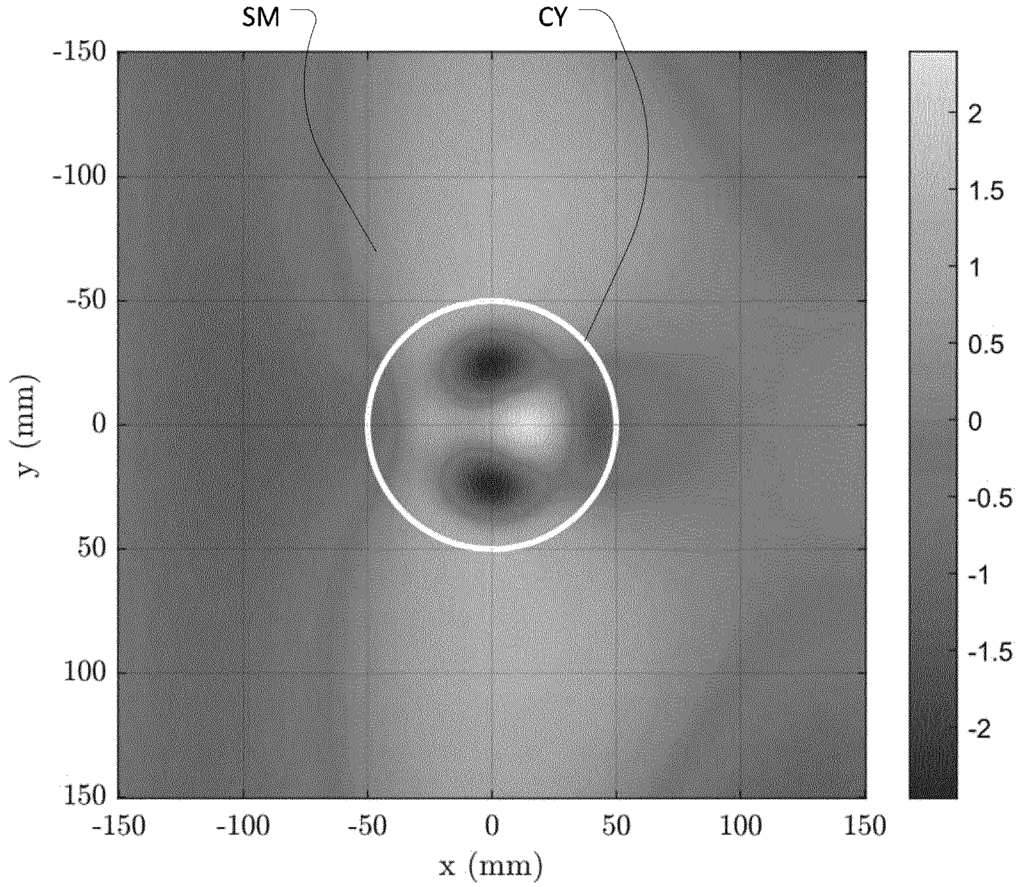
FIG. 4 is a diagram illustrating a sound field for a plane wave impinging onto an infinite cylinder filled with an AMM featuring low phase velocity compared to that in SM.

FIG. 4 illustrates a simulated sound field of a plane wave impinging onto an infinite cylinder comprised of acoustic metamaterial. An infinite cylinder CY made of acoustic metamaterial AMM is placed into a surrounding medium SM (here air) as describe above in FIGS. 2 and 3. The acoustic metamaterial AMM of the infinite cylinder CY is configured such that the phase velocity of an acoustic wave in the acoustic metamaterial AMM is smaller than the phase velocity in the surrounding medium at a given frequency. As in FIGS. 2 and 3, the infinite cylinder CY is visualized in a cross-sectional view. According to the acoustic simulation, a plane wave with frequency 1412.5 Hz impinges from the left onto the infinite cylinder made of acoustic metamaterial AMM.

FIG. 4 shows a density plot of the acoustic pressure as obtained from the simulation. Both axes of the density plot represent the spatial axes x and y, respectively. Distances are displayed in mm in the range of −150 mm to +150 mm. The infinite cylinder CY has a diameter of 10 cm and spreads (infinitely) along the z-axis. The contour plot shows, for each point in the xy plane, a respective acoustic pressure obtained from the simulation. This acoustic pressure is the local pressure deviation caused by the plane wave from the (static) ambient atmospheric pressure. The grey scale levels of the density plot represent the acoustic pressure in Pascal in the range from −2.5 Pa to +2.5 Pa.

It can be seen from the pattern of the acoustic pressure that the phase velocity inside the infinite cylinder CY is smaller than in the surrounding medium SM. This increased local variation facilitates the creation of super-directional beamformers at low frequencies where a high directivity would otherwise not be possible within the same spatial dimensions.

Figure 5:
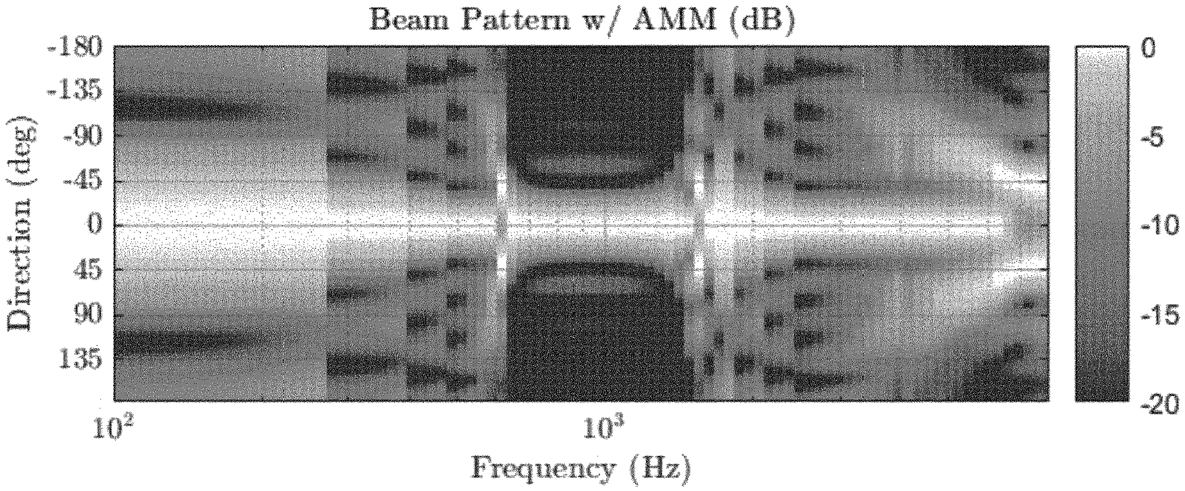
FIG. 5 is a diagram illustrating a beam pattern for a circular microphone array embedded into an acoustic metamaterial featuring low phase velocity at low frequencies.

FIG. 5 visualizes a simulated directivity pattern of a circular microphone array embedded into an acoustic metamaterial at different frequencies. This density plot representing the directivity pattern corresponds to FIG. 1 with the added feature of an acoustic metamaterial. As in FIG. 1 the simulated directivity pattern has been obtained with the circular microphone array comprising L=9 microphones with radius r=0.1 m. The frequency of the acoustic wave received by the microphone array is displayed on the x-axis with a range of 100 Hz to 8 kHz. The y-axis of the density plot represents the array response to plane waves impinging from directions from −180 to 180 degrees, while the array is set to aim for the 0-degree direction. The grey-scale of the density plot represents, for each frequency and direction the normalised array response in decibels in the range from 0 to −20 decibels. As in FIG. 1, the bright areas illustrate a strong response and dark areas illustrate the directions with no or low response to an incoming plane wave. It can be seen that the directivity is significantly improved between 100 to 1300 Hz, while at frequencies above 3 kHz, the performance is yet comparable. It follows that embedding the sensor array into a metamaterial that exhibits a property of providing a low phase velocity at low frequencies significantly improves the directivity at low frequencies, while preserving the performance at high frequencies. The introduction of the metamaterial is therefore not a trade-off but a clear improvement on directivity and frequency range.

Figure 6:
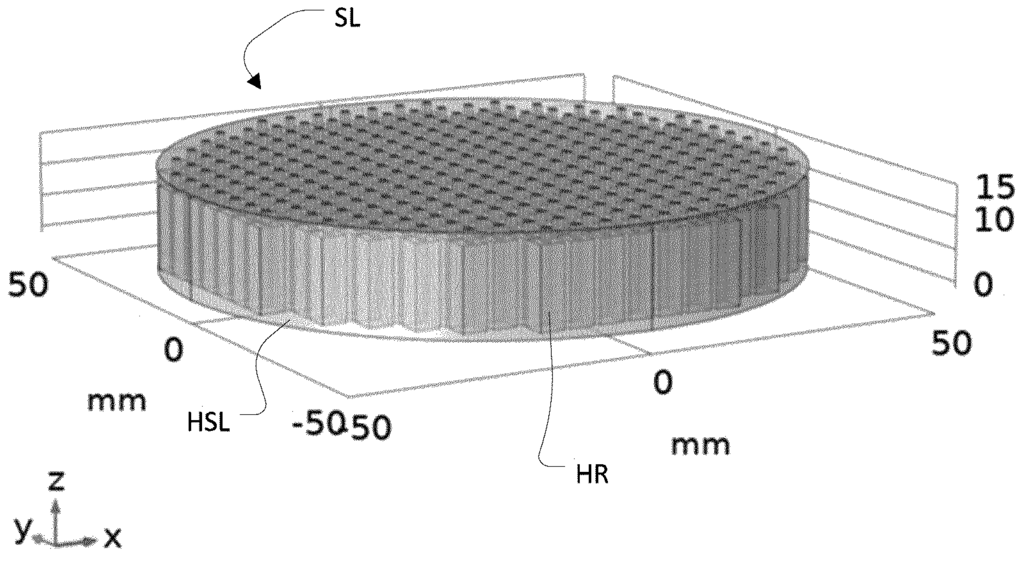
FIG. 6 is a diagram illustrating a cylindrical slab used as building block for creating an acoustic metamaterial.
Figure 8:
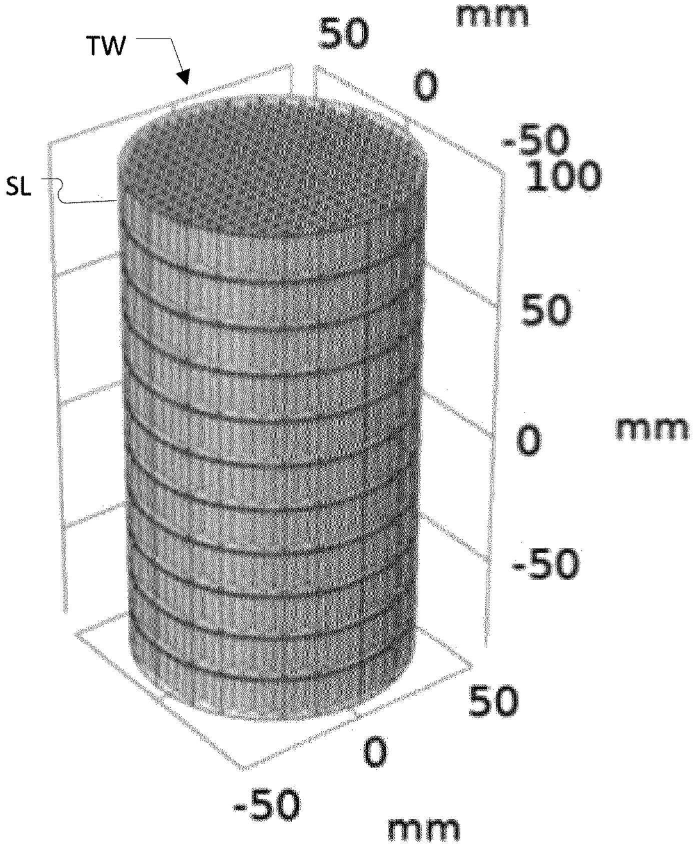
FIG. 8 is a diagram schematically illustrating a tower (TW) comprising cylindrical slabs of AMM (SL)

FIG. 6 schematically illustrates a cylindrical slab used as building block for creating a metamaterial that permits sound to travel along parallel to the xy-plane. A cylindrical slab SL for building a metamaterial AMM as proposed in the present embodiment can serve to create slow phase velocities at low frequencies. The axes of the diagram represent distance in mm. The cylindrical slab SL has dimensions of height 17 mm and diameter 100 mm and comprises a multitude of identical Helmholtz resonators HR embedded into a housing cylindrical slab HSL of acoustically rigid material. Other resonators, e.g. quarter wave-length resonators, could also be used to achieve the purpose of the invention. In the embodiment of FIG. 6 the acoustic metamaterial has a disk-like or slab-like shape. The skilled person will readily appreciate that the metamaterial device can also be of cubic, spherical or cuboid or any other geometrical shape. It should also be noted that in order to achieve an acoustic metamaterial, the slab displayed in FIG. 6 communicates with another acoustically rigid boundary (not shown in FIG. 6) just above the openings of the resonators, creating a thin horizontal channel above the resonators. In the embodiment of FIG. 8, this second acoustically rigid boundary is created by stacking the slabs with a small gap, since the underside of the slab poses a rigid boundary.

Figure 7:
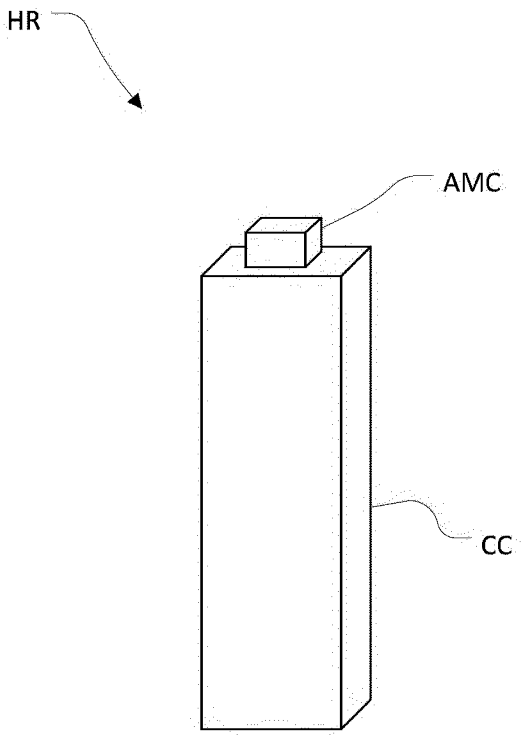
FIG. 7 is a diagram schematically illustrating a Helmholtz resonator composed of an acoustic mass (AMC) and an acoustic compliance (CC)

FIG. 7 illustrates a Helmholtz resonator. A Helmholtz resonator HR as proposed in the present embodiment comprises a larger compliance cavity CC and a small acoustic mass channel AMC. The compliance cavity CC may for example have the dimensions 4×4×13 $mm^3$ and the acoustic mass channel AMC may for example have the dimensions 1.5×1.5×2 $mm^3$.

The air in the acoustic mass channel forms an inertial mass-system because of the air's own inertial mass. Combined with the elasticity of the volume of the compliance cavity $V_0$ the hole resonator forms a mass-spring system and hence a harmonic oscillator. For a spherical volume $V_0$, approximately for a cubic volume $V_0$ and the cross section of the mass channel $S_0$ the mass-spring system has exactly one resonance frequency that can be calculated as $$f_H = \frac{c_s}{2\pi} \cdot \sqrt{\frac{S_0}{V_0 \cdot L_{eq}}}$$

Further factors in the formula are the speed of sound $c_s$ in the gas filling the rigid container (mostly air), and the so called equivalent length $L_{eq}$ of the neck with end correction, which can be calculated as $L_{eq}$=L+0.3 D, where L is the actual length of the neck and D is the hydraulic diameter of the neck.

FIG. 8 visualizes a tower comprising cylindrical slabs as described in FIG. 6. The axes of the diagram represent the spatial axes. Distances are given in mm. The cylindrical slab SL is itself a building stone of a metamaterial structure suitable to house a microphone array. Piling a plurality of these slabs into a tower TW with a gap of here, for example, 1-2 mm between each cylindrical slab SL yields an acoustic environment that creates low phase velocities at low frequencies within the gaps. These gaps acts as thin horizontal channel above the resonators, where the underside of the slab on top poses an acoustically rigid boundary and the topside of the slab below is a rigid boundary that is periodically filled in with resonators.

In this particular embodiment there are eleven cylindrical slabs SL and a microphone array (not shown here) is placed in the centre of the cylindrical gap between two cylindrical slabs SL. The spacing and the arrangement of the slabs, as well as the dimensions and structure of the slabs, and the arrangement of the microphone array can be chosen to fine-tune the exact directivity response. By stacking the slabs with a small gap, since the underside of a slab poses a rigid boundary, a second acoustically rigid boundary is created just above the openings of the resonators, creating a thin horizontal channel above the resonators.

In the embodiment of FIG. 8, the microphones are embedded in a tower comprising cylindrical slabs. In other embodiments, the microphones may be embedded into a metamaterial whose outline can be of any shape. Also, in the embodiment of FIG. 8, sound travels through the acoustic metamaterial in the xy-plane, but not along the z-axis. The embodiments are, however, not limited to this. In alternative embodiments, sound may travel through the acoustic metamaterial in any arbitrary direction.

Figure 9:
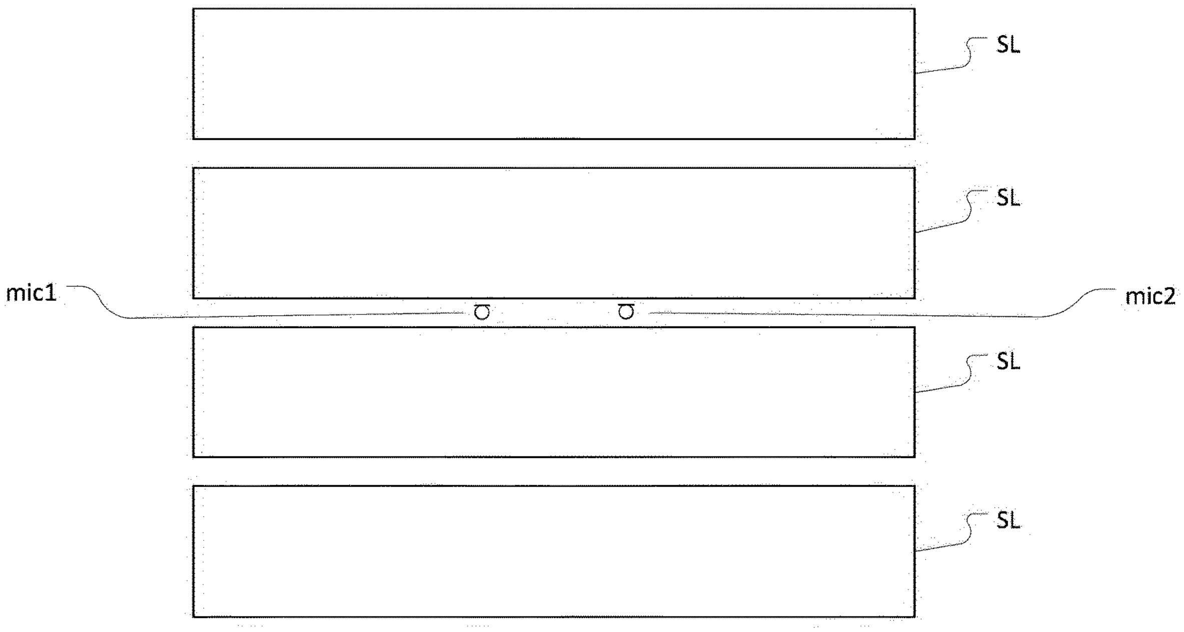
FIG. 9 is a diagram schematically illustrating a conceptual side view of the tower structure shown in FIG. 8, including an exemplary microphone array between two slabs.

FIG. 9 schematically illustrates a conceptual side view of the tower structure shown in FIG. 8. In this diagram the tower TW comprises four cylindrical slabs SL and a microphone array comprising two microphones mic1 and mic2. The microphone array is placed in the gap between two cylindrical slabs.

Figure 10B:
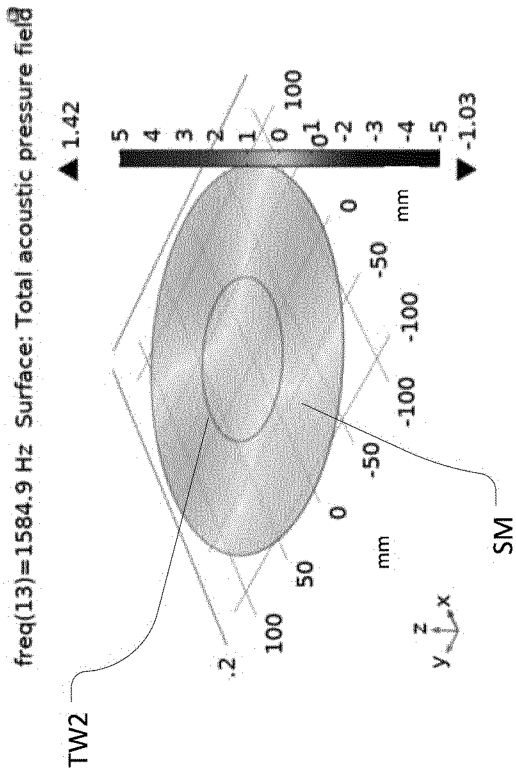
FIG. 10*b* is a diagram illustrating a simulation result for the pressure field of a plane wave travelling inside a tower without metamaterial.
Figure 10A:
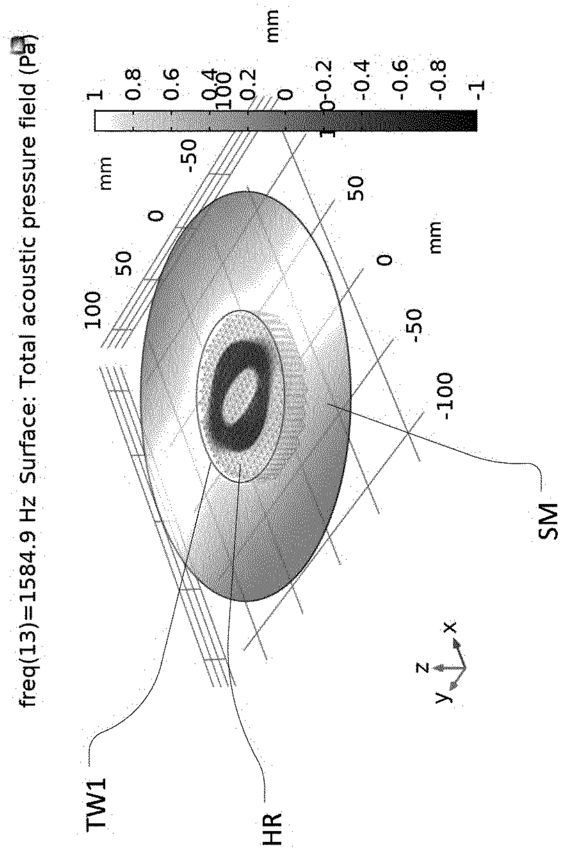
FIG. 10*a* is a diagram illustrating a simulation result for the pressure field of a plane wave travelling inside the tower with metamaterial.

FIG. 10*a* visualizes a simulation result for the pressure field of a plane wave travelling in a surrounding medium and inside the tower with metamaterial. The pressure field is visualized as a density plot. The axes of the diagram represent distance in mm and the grey scale represents the pressure deviation from the pressure of the respective medium. A tower TW1 comprising an acoustic metamaterial with Helmholtz resonators HR is visualized in a surrounding medium SM. It can be seen from the pattern of the density plot that the presence of the Helmholtz resonators HR reduces the phase velocity compared to the surrounding medium SM, leading to a significantly shorter wavelength within the gap. The wavelength outside the structure would be 343 $ms^{-1}$/584.9 Hz=21.6 cm, so larger than the structure with 10 cm diameter.

FIG. 10*b* visualizes a simulation result for the pressure field of a plane wave travelling in positive x direction in a surrounding medium and the same tower as FIG. 10*a* but without embedding the Helmholtz resonators. The tower TW1 is essentially filled with air. It can be seen that some refraction occurs, but the overall wavelength is not changed significantly inside the gap.

Figure 11:
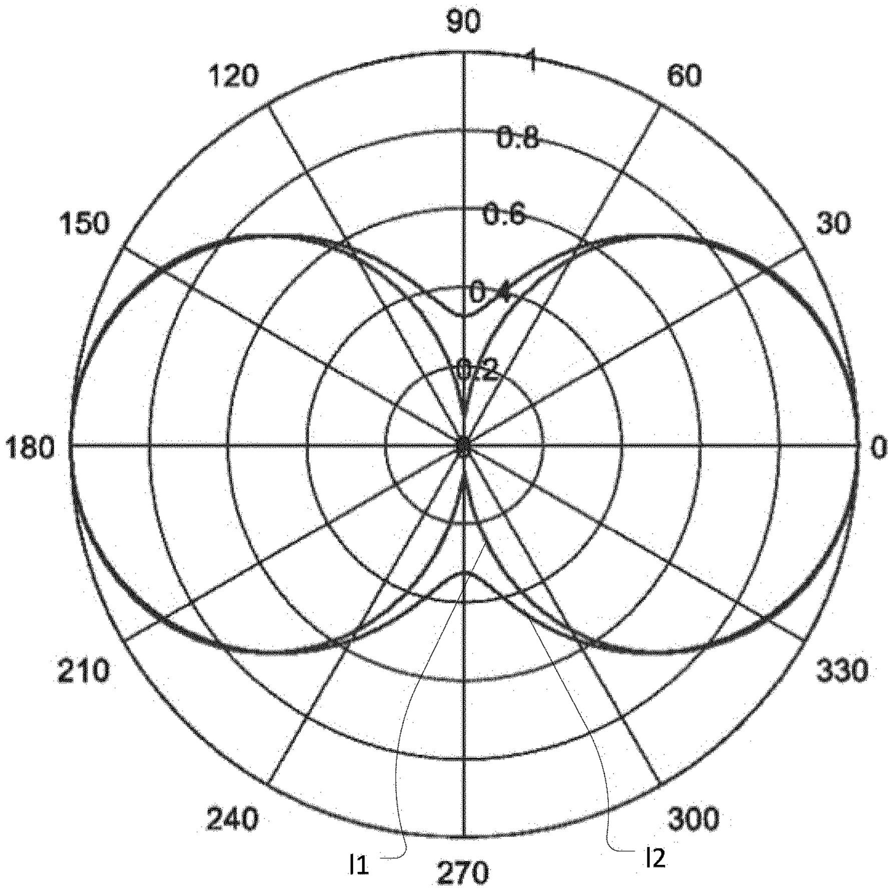
FIG. 11 is a diagram illustrating the directivity response for a dipole of microphones embedded in the tower with metamaterial and without metamaterial, where the speed of sound in the metamaterial is approximately 18.6 percent of that without a metamaterial.

FIG. 11 visualizes the simulated directivity response for a dipole of microphones embedded within the gap in a tower as described in FIG. 8. Simulation results are provided for the case where the tower (TW in FIG. 8) is comprised of slabs of metamaterial and for the case where the slabs are filled with air (effectively no metamaterial tower). The diagram illustrates the directivity response, i.e. the response of the microphone array to plane waves impinging onto the structure from a given angle $\phi$ at f=1584.9 Hz for two microphones embedded 1 cm apart within the gap in the tower. The circular scale represents the direction of a recognized acoustic signal in degrees. The radial scale represents the sensitivity, normalized to the maximal sensitivity which is received from the directions 0° and 180°. The directivity of the dipole of microphones embedded within the gap in the tower with metamaterial is represented by line 11 and the directivity of the dipole of microphones embedded within the gap in the tower filled with air is represented by line 12. From standard microphone array literature, it is known that the signals from the two microphones can be combined to create a dipole response by taking the difference of the two signals. The result would be a figure-of-eight directivity. It can be clearly seen in the simulated directivity of FIG. 11 that the response of the structure with metamaterial represented by line 11 almost perfectly resembles a figure-of-eight with maximal sensitivity in the directions 0° and 180° and minimal sensitivity in the directions 90° and 270°, which is an indicator of high directivity, while line 12 representing the structure without metamaterial has shifted shape towards an omnidirectional response (1 everywhere) significantly. For both simulations, the same uncorrelated background noise level was assumed. This shows that the introduction of the metamaterial improves the directivity at low frequencies.

Figure 12:
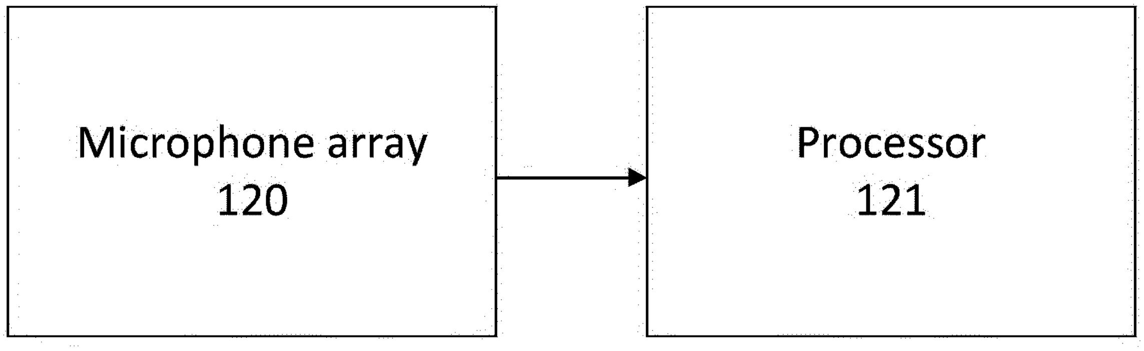
FIG. 12 is a diagram schematically illustrating a system comprising a microphone array and a beamforming processor.

FIG. 12 schematically shows a system comprising a microphone array 120 embedded in an acoustic material, and a processor 121 configured to evaluate the signals received by the microphone array to analyze the sound field captured by the microphone array. An acoustic metamaterial influences the directivity pattern of each of the microphones in the microphone array as described in FIG. 11. The skilled person may measure the directivity pattern of each microphone as modified by the acoustic metamaterial. This corresponds to measuring the frequency response obtained at each microphone for a plane-wave impinging from all possible directions. Accordingly, the processor 121 processes instructions of a computer program which creates a directivity pattern of the microphone array by evaluating the signals from the individual microphones of the microphone array. For example, by taking into account the directivity patterns of all microphones of the microphone array as modified by the acoustic metamaterial, a "virtual" directivity pattern of the microphone array can be produced as described by Buck, M., Hänsler, E., Krini, M., Schmidt, G. and Wolff, T. disclose in the "Handbook on Array Processing and Sensor Networks", 2010, eds S. Haykin and K. J. R. Liu a chapter "Acoustic Array Processing for Speech Enhancement" [11]. Other approaches to determine the effective directivity pattern of the microphone array by analyzing the sound field captured by the microphone array can be found in references [1] and [2]. In particular, a so called "Filter-and-sum" beamformer approach can be applied. Also, "delay-and-sum" beamformer, a "filter-and-sum" beamformer, a super-directive beamformer, and various other variants may be used. According to these techniques, by weighting or filtering (frequency dependent weighting) and then summing signals from the different microphones of the microphone array, a directivity pattern of the microphone array is produced (an effective directivity pattern that results from the combination of all microphones of the microphones and the influence of the metamaterial on the microphone array). In particular, the scattering or refraction introduced by the impedance change on the boundary between the acoustic metamaterial and the surrounding medium is responsible for giving a single omnidirectional microphone a directivity. For example, FIR filters can be used on each microphone signal before the summation of all channels to implement the targeted directivity pattern of the array. Typically, the different positions of the microphones in the microphone array are taken into account and are compensated.

US patent No. US2010/0329478 A1 [8] discloses a sensor system being located in an environment composed of a first medium, where waves propagate with a first phase velocity, the sensor system including at least one main enclosure and a sensor array with at least two sensors, said sensor array being arranged inside the main enclosure, wherein the space inside the main enclosure between the sensor array and the inner surface of the main enclosure is filled with a second medium, in which waves propagate with a second phase velocity, the second phase velocity being different from the first velocity. This mechanism can be used to shift the sensor array's frequency band of optimum directivity either up or down. However, naturally, if the medium is chosen such that it improves the directivity at lower frequencies, compared to air, the frequency above which spatial aliasing occurs also shifts down. This technique poses a means of optimization, but it remains a tradeoff.

The embodiments may also comprise:

[1] A device comprising:

an acoustic metamaterial (AMM), wherein the phase velocity of an acoustic wave is reduced at low frequencies;

a microphone array (MIC) of at least two microphones (mic1, mic2) embedded in the acoustic metamaterial (AMM) and configured to detect acoustic waves.

[2] The device of [1], wherein in the acoustic metamaterial (AMM), at low frequencies, the phase velocity of an acoustic wave is reduced as compared to a surrounding medium (SM).

[3] The device of [1] or [2], wherein in the acoustic metamaterial (AMM), at low frequencies, the phase velocity of an acoustic wave is significantly lower as compared to the phase velocity in a surrounding medium (SM).

[4] The device of anyone of [1] to [3], wherein at high frequencies, an acoustic wave in the acoustic metamaterial (AMM) exhibits a phase velocity similar to that in a surrounding medium (SM).

[5] The device of anyone of [1] to [4], wherein in the acoustic metamaterial (AMM) an acoustic wave exhibits a low phase velocity at low frequencies.

[6] The device of anyone of [1] to [5], wherein the directivity of the microphone array (MIC) is improved at low frequencies, while the performance at high frequencies is preserved as compared to the microphone array (MIC) not being embedded in the acoustic metamaterial (AMM).

[7] The device of anyone of [1] to [6], wherein in the acoustic metamaterial (AMM) the phase velocity of an acoustic wave with a low frequency is different to the phase velocity in a surrounding medium (SM), while the phase velocity of acoustic waves with a middle or high frequency is not different to the phase velocity in a surrounding medium (SM).

[8] The device of anyone of [1] to [7], wherein the acoustic metamaterial (AMM) comprises an acoustically rigid housing material and a plurality of resonators.

[9] The device of anyone of [1] to [8], wherein the resonators are Helmholtz resonators (HR), membranes, and/or quarter wavelength resonators.

[10] The device of anyone of [1] to [9], wherein the acoustic metamaterial (AMM) comprises a plurality of segments of acoustic metamaterial (AMM).

[11] The device of anyone of [1] to [10], wherein the segments of acoustic metamaterial (AMM) are slabs (SL) which are arranged in a tower (TW).

[12] System comprising the device of [1] to [11], and a processor (130) configured to evaluate the signals received by the microphone array to yield a directivity pattern of the microphone array.

[13] A computer-implemented method of receiving signals from a device as defined in [1] to [12], and evaluating the signals received by a microphone array of the device to yield a directivity pattern of the microphone array.

TECHNICAL BACKGROUND

Microphone arrays typically comprise a set of microphones distributed about the perimeter of a space linked to an evaluation device that records and processes the electric signals into a coherent. Typically, an array is made up of multiple microphones (omnidirectional, but also directional microphones).

State-of-the-art microphone array technology suffers from limited and corrupted directivity outside an array-specific optimum frequency band. The maximum directivity of a microphone array is determined by the size of the array aperture, the number of sensors therein and their arrangement.

Accordingly, there is a need to enhance the directivity characteristics of microphone arrays.

REFERENCES

[1] H. L. Van Trees—Optimum Array Processing—Wiley (2002)

[2] Mingsian R. Bai, Jeong-Guon Ih, Jacob Benesty, Acoustic Array Systems: Theory, Implementation, and Application, Wiley-IEEE Press, 2013

[3] F. Hoffmann and F. M. Fazi, "Theoretical Study of Acoustic Circular Arrays With Tangential Pressure Gradient Sensors," in IEEE/ACM Transactions on Audio, Speech, and Language Processing, vol. 23, no. 11, pp. 1762-1774, November 2015, doi: 10.1109/TASLP.2015.2449083.

[4] Poletti, M. A., Effect of Noise and Transducer Variability on the Performance of Circular Microphone Arrays, Journal of the Audio Engineering Society, 2005, 53, 371-384

[5] Jens Meyer, Gary Elko, Spherical Harmonic Modal Beamforming for an Augmented Circular Microphone Array, ICASSP 2008,

[6] D. L. Alon, B. Rafaely, Beamforming with Optimal Aliasing Cancellation in Spherical Microphone Arrays, IEEE/ACM Trans. Audio, Speech and Lang. Proc., IEEE Press, 2016, 24, 196-210

[7] Gary W. Elko, Jens M. Meyer, Polyhedral audio system based on at least second-order eigen-beams, Patent US2014/0270245 A1

[8] G. Kubin, M. Kepesi, M. Stark, Housing for microphone arrays and multi-sensor devices for their size optimization, Patent US2010/0329478 A1

[9] Groby, J.-P.; Huang, W.; Lardeau, A.; Auregan, Y., The use of slow waves to design simple sound absorbing materials, Journal of Applied Physics, AIP Publishing, 2015, 117, 124903

[10] Marc Moonen and Simon Doclo, Digital Audio Signal Processing, 2013/2014, https://homes.esat.kuleuven.be/~dspuser/dasp/material/Slides_2013_2014/Lecture-2.pdf

[11] Markus Buck, Eberhard Hansler, Mohamed Krini, Gerhard Schmidt, Tobias Wolff, Handbook on Array Processing and Sensor Networks, 2010, Editors: Simon Haykin K. J. Ray Liu, Chapter 8 "Acoustic Array Processing for Speech Enhancement", https://onlinelibrary.wiley.com/doi/pdf/10.1002/9780470487068.ch8

LIST OF REFERENCE SIGNS

AMM Acoustic metamaterial
PW Plane wave
SM Surrounding material
CY Infinite cylinder
MIC Microphone array
1 Microphone 1
2 Microphone 2
3 Microphone 3
4 Microphone 4
e Vector
SL Cylindrical slab
HSL Housing cylindrical slab
HR Helmholtz resonator
AMC Acoustic mass channel
CC Compliance cavity
TW Tower
mic1 Microphone
mic2 Microphone
TW1 Tower with metamaterial
TW2 Tower without metamaterial
11 Directivity in TW1
12 Directivity in TW2

The invention claimed is:

1. A device comprising:

an acoustic metamaterial; and a microphone array of at least two microphones embedded in the acoustic metamaterial and configured to detect acoustic waves, wherein directivity of the microphone array is improved at low frequencies while performance at high frequencies is preserved, as compared to a microphone array not being embedded in the acoustic metamaterial.

2. The device of claim 1, wherein, in the acoustic metamaterial, at low frequencies, a phase velocity of an acoustic wave is reduced as compared to a surrounding medium.

3. The device of claim 1, wherein, in the acoustic metamaterial, at low frequencies, a phase velocity of an acoustic wave is significantly lower as compared to the phase velocity in a surrounding medium.

4. The device of claim 1, wherein at high frequencies, an acoustic wave in the acoustic metamaterial exhibits a phase velocity similar to that in a surrounding medium.

5. The device of claim 1, wherein, in the acoustic metamaterial, an acoustic wave exhibits a low phase velocity at low frequencies.

6. The device of claim 1, wherein, in the acoustic metamaterial, a phase velocity of an acoustic wave with a low frequency is different from the phase velocity in a surrounding medium, while a phase velocity of acoustic waves with a middle or high frequency is not different from the phase velocity in a surrounding medium.

7. The device of claim 1, wherein the acoustic metamaterial comprises an acoustically rigid housing material and a plurality of resonators.

8. The device of claim 7, wherein the resonators are Helmholtz resonators, membranes, and/or quarter wavelength resonators.

9. The device of claim 1, wherein the acoustic metamaterial comprises a plurality of segments of acoustic metamaterial.

10. The device of claim 9, wherein the segments of acoustic metamaterial are slabs which are arranged in a tower.

11. A system comprising:

the device of claim 1, and a processor configured to evaluate signals received by the microphone array to create a directivity pattern of the microphone array.

12. A computer-implemented method comprising:

receiving signals from the device as defined in claim 1, and evaluating the signals to create a directivity pattern of the microphone array.

13. The device of claim 1, wherein, in the acoustic metamaterial, a phase velocity of an acoustic wave is reduced at low frequencies as compared to the phase velocity at higher frequencies.

14. A device comprising:

an acoustic metamaterial; and a microphone array of at least two microphones embedded in the acoustic metamaterial and configured to detect acoustic waves, wherein, in the acoustic metamaterial, a phase velocity of an acoustic wave with a low frequency is different from the phase velocity in a surrounding medium, while a phase velocity of acoustic waves with a middle or high frequency is not different from the phase velocity in a surrounding medium.

15. A system comprising:

the device of claim 14, and a processor configured to evaluate signals received by the microphone array to create a directivity pattern of the microphone array.

16. A computer-implemented method comprising:

receiving signals from the device as defined in claim 14, and evaluating the signals to create a directivity pattern of the microphone array.

* * * * *